United States Patent
Tsukada et al.

(10) Patent No.: US 10,334,185 B2
(45) Date of Patent: Jun. 25, 2019

(54) IMAGE CAPTURING DEVICE, SIGNAL SEPARATION DEVICE, AND IMAGE CAPTURING METHOD

(71) Applicant: NEC Corporation, Minato-ku, Tokyo (JP)

(72) Inventors: Masato Tsukada, Tokyo (JP); Kimberly Nancy McGuire, Delft (NL)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 15/122,034

(22) PCT Filed: Mar. 3, 2015

(86) PCT No.: PCT/JP2015/001121
§ 371 (c)(1),
(2) Date: Aug. 26, 2016

(87) PCT Pub. No.: WO2015/133130
PCT Pub. Date: Sep. 11, 2015

(65) Prior Publication Data
US 2017/0019614 A1  Jan. 19, 2017

(30) Foreign Application Priority Data
Mar. 6, 2014 (JP) ................................ 2014-044447

(51) Int. Cl.
*H04N 5/00* (2011.01)
*H04N 5/33* (2006.01)
(Continued)

(52) U.S. Cl.
CPC ............. *H04N 5/332* (2013.01); *G02B 5/208* (2013.01); *H04N 9/045* (2013.01); *H04N 2209/047* (2013.01)

(58) Field of Classification Search
CPC ..................................................... H04N 5/332
(Continued)

(56) References Cited

U.S. PATENT DOCUMENTS

| | | | | |
|---|---|---|---|---|
| 5,121,445 A | * | 6/1992 | Tsujiuchi | ................. H04N 1/58 358/408 |
| 2007/0183657 A1 | * | 8/2007 | Kidono | ................ G06K 9/2018 382/162 |
| 2011/0235017 A1 | * | 9/2011 | Iwasaki | ................ H04N 5/2354 356/4.01 |

FOREIGN PATENT DOCUMENTS

| | | |
|---|---|---|
| JP | 2001-69519 A | 3/2001 |
| JP | 2005-6066 A | 1/2005 |

(Continued)

OTHER PUBLICATIONS

O. Losson, L. Macaire, Y. Yang, "Comparison of Color Demosaicking Methods", Advances in Imaging and Electron Physics, vol. 162, Chapter 5, pp. 173-265, 2010.

(Continued)

*Primary Examiner* — Dave Czekaj
*Assistant Examiner* — Shanika M Brumfield

(57) ABSTRACT

Disclosed is a video capturing device which enables easy video processing in a visible light region and a near-infrared region while utilizing the configuration of a general video capturing device. This video capturing device is provided with a video data acquisition means for acquiring video data including a periodic pattern of near-infrared light, and a video processing means for acquiring a color signal of a visible light component and a near-infrared signal from the video data on the basis of the periodic pattern.

6 Claims, 15 Drawing Sheets

(51) Int. Cl.
*H04N 9/04* (2006.01)
*G02B 5/20* (2006.01)

(58) Field of Classification Search
USPC .......................................................... 348/164
See application file for complete search history.

(56) References Cited

FOREIGN PATENT DOCUMENTS

| JP | 2007-184805 A | | 7/2007 | | |
| JP | 2007184805 A | * | 7/2007 | ........... | G06K 9/2018 |
| JP | 2007184805 A | * | 7/2007 | ........... | G06K 9/2018 |
| JP | 2011-243862 A | | 12/2011 | | |
| JP | 2012-075179 A | | 4/2012 | | |
| JP | 2012-80553 A | | 4/2012 | | |

OTHER PUBLICATIONS

R. Ramanath, W. Snyder, G. Bilbro, W. Sander, "Demosaicking methods for Bayer color arrays", Journal of Electronic Imaging, vol. 1, No. 3, pp. 306-315, Jul. 2002.
S. Ferradans, M. Bertalmio, V. Caselles, "Geometry-Based Demosaicking", IEEE Transactions on Image Processing, vol. 18, No. 3, pp. 665-670, Mar. 2009.
International Search Report for PCT Application No. PCT/JP2015/001121, dated May 19, 2015.
English translation of Written opinion for PCT Application No. PCT/JP2015/001121.

* cited by examiner

Related Art

Related Art

Related Art

Related Art

Related Art

Fig. 11

|   | 1 | 2 | 3 | 4 | 5 | 6 |
|---|---|---|---|---|---|---|
| 1 | R | G | R | G | R | G |
| 2 | G | B | G | B | G | B |
| 3 | R | G | R | G | R | G |
| 4 | G | B | G | B | G | B |

Fig. 12

IMAGE CAPTURING DEVICE, SIGNAL SEPARATION DEVICE, AND IMAGE CAPTURING METHOD

This application is a National Stage Entry of PCT/JP2015/001121 filed on Mar. 3, 2015, which claims priority from Japanese Patent Application 2014-044447 filed on Mar. 6, 2014, the contents of all of which are incorporated herein by reference, in their entirety.

TECHNICAL FIELD

The present invention relates to an image capturing technique, and in particular, to an image capturing technique pertaining to an image processing for a visible light region and a near-infrared region.

BACKGROUND ART

Regarding image capturing devices such as digital cameras or video cameras, their image sensors usually include a red (R), green (G), blue (B) three-color optical filter. A light incident on a camera is separated by such a three-color optical filter, and an image sensor converts the separated lights into image signals, thereby generating RGB image data.

When an image sensor which is used in an image capturing device is a silicon-based sensor, the image sensor is sensitive to a light in the visible light region to the near infrared region. On the other hand, since highly precise color reproduction is required for a digital camera or a video camera, a near infrared light which will adversely affect color reproduction is removed by a near infrared cut filter. This is because, while an R, G, B three-color optical filter secures the transmittance in a wavelength band in the visible light region for which each filter is responsible, there are some cases in which the transmittance characteristics of a light in the near infrared region which is outside the visible light region are not taken into consideration.

FIG. 1 is an example illustrating spectral transmittances of an RGB three-color optical filter. Assuming the visible light region to be wavelengths of 400 nm to 700 nm, each color filter is expected to have characteristics that a light having a wavelength of about 400 nm to 500 nm (a B filter), about 500 nm to 600 nm (a G filter), or about 600 nm to 700 nm (an R filter) is passed through. As illustrated in FIG. 1, it is however confirmed that each filter has characteristics that a light having a wavelength of 700 nm or longer which is outside the visible light region or a near infrared light is passed therethrough.

Incidentally, the spectral sensitivity characteristics of a photodiode image sensor which is generally employed in a color image input device such as a digital camera or a video camera also has a sensitivity in a wavelength region of 700 nm or longer. Only applying a three-color optical filter having the spectral characteristics of FIG. 1 as it is to an image sensor will cause a problem, from the viewpoint of color reproduction.

The color-matching functions of the XYZ color system for color perception of human beings are as illustrated in FIG. 2. Regarding color perception of human beings, the sensitivity to a light having a wavelength of 700 nm or longer is zero, and therefore, a light having a power in a wavelength region of 700 nm or longer does not influence perceived color which is a psychophysical quantity.

Now, as illustrated in FIG. 3, a case of observation of a light having a power in a wavelength region of 600 nm or longer will be taken into consideration. In the case of human beings, the light is perceived as red. On the other hand, when the light is observed with an image sensor by using a three-color optical filter having characteristics illustrated in FIG. 1, output signals of the sensor include not only an R value but also G and B values. As a result, a color which is different from a red color perceived by human beings is observed. As describe above, a cause of a problem of color reproduction is that the spectral transmittances are not zero in wavelength regions of 700 nm or longer of G and B optical filters.

In order to attain a highly precise color reproduction for color perception of human beings in a color image input device, an infrared light (IR: infrared) cut filter having a spectral transmittance which eliminates the influence of a near infrared light having a wavelength of 700 nm or longer as illustrated in FIG. 4 is used. Specifically, as illustrated in FIG. 5, an IR cut filter is incorporated into an optical system of a color image input device to intercept penetration of a near infrared light into a three-color optical filter and an image sensor. Due to such a configuration, a light having a power only in the wavelength region of a visible light is input to the three-color optical filter, and the lights separated by the three-color optical filter are input to the image sensor, whereby RGB signals are generated.

On the other hand, when an image is taken at nighttime out of doors or in a dark place, highly sensitive image capturing with reduced noise is demanded. In such a case, in order to reduce sensor noise caused by an insufficient quantity of light, it is desired that as large a quantity of light as possible is received by an image sensor. In order to attain highly sensitive image capturing in a dark place, a method of picking up an image by utilizing a light having a wavelength in the near infrared region is proposed. Examples of the simplest method include a method in which an IR cut filter set in an optical system is mechanically removed during highly sensitive image capturing. This method, however, not only increases the cost of products due to the increased number of parts thereof but has a major risk that it is highly probable that the product malfunctions during its long period of use since a mechanical action of removing the IR cut filter is required.

As a method of picking up an RGB image and an IR (NIR: Near Infra-Red) image without requiring a mechanical action, a method which uses two cameras capturing an RGB image and an IR image, respectively is proposed in NPL 1.

NPL 2 proposes an image sensor into which a four-color optical filter in which an IR filter passing through a near infrared (NIR) light is added to an RGB three-color optical filter is incorporated, as illustrated in FIG. 6. A second figure of NPL 2 illustrates the spectral sensitivity characteristics of each of the optical filters R, G, B, and IR. The spectral sensitivity characteristics of each of the color filters R, G, and B has a spectral sensitivity similar to that of the IR filter with respect to a near infrared light. When an image is taken in daylight, in order to attain a high color reproduction, influences of near infrared lights involved in R, G, and B need to be eliminated. An image sensor of NPL 2 generates R, G, and B signals while eliminating influences of near infrared lights involved in R, G, and B by utilizing an IR signal obtained by passing through the IR filter. When an image is taken at nighttime, all of the R, G, B, and IR signals are utilized.

PTL 1 proposes an image capturing device which generates R, G, B, and NIR signals by using an R, G, B three-color optical filter through which a near infrared light passes and by using a special photo sensor which senses a near infrared light (NIR). For example, a light which has passed through an R filter corresponds to R+NIR and are made incident to the photo sensor. The photo sensor is composed of a visible light sensor unit which detects R at a shallow position in the light incident direction and a non-visible light sensor unit which detects NIR at a deep position in the light incident direction. Regarding G and B, a similar configuration as mentioned above is employed.

NPL 3 illustrates one example of a method of demosaicing processing, which will be mentioned for explaining the present exemplary embodiment. NPL 4 illustrates a method using Gradient Based Interpolation which will be mentioned below. NPL 5 illustrates one example of a method of demosaicing processing. PTL 2 discloses an imaging device that can remove the influences of unnecessary wavelength region components, such as infrared light, without using an infrared light filter.

CITATION LIST

Patent Literature

PTL 1: Japanese Patent Application Laid-open Publication No. 2011-243862
PTL 2: Japanese Patent Application Laid-open Publication No. 2012-075179
NPL 1: Sosuke Matsui, Mihoko Shimano, Takahiro Okabe, Yoichi Sato, "Image Enhancement of Low-Light Scenes with Combination of Color Image and Near Infrared Images", *The 12th Meeting on Image Recognitio n and Understanding* (*MIRU* 2009), collection of papers, pp. 1089-1096, 2009
NPL 2: Kayama, Tanaka, Hirose, "Day-and-night imager for security monitoring cameras", *PanasonicTechnical Journal* Vol. 54, No. 4, January, 2009
NPL 3: O. Losson, L. Macaire, Y. Yang,"Comparison of Color Demosaicking Methods",Advances in Imaging and Electron Physics, Vol. 162, p.p. 173-265, 2010.
NPL 4: R. Ramanath, W. Snyder, G. Bilbro, W. Sander, "Demosaicking methods for Bayer color array", J. Electronic Imaging, Vol. 11, No. 3, p.p. 306-315, 2002.
NPL 5: S. Ferradans, M. Bertalmio, V. Caselles,"Geometry-Based Demosaicking", IEEE Trans. on Image Processing, Vol. 18, No. 3, p.p. 665-670, 2009.

SUMMARY OF INVENTION

Technical Problem

The method of NPL 1 has a problem that, although a high-resolution RGB image and NIR image can be generated by using two cameras, it is hard to make the image input device compact and the cost of the image input device becomes high. Although it is possible to incorporate the same method as described above into one device, it is hard to resolve the above-described problems since two optical paths RGB and NIR and two image sensors are needed.

The image sensors of NPL 2 and PTL 1 are a special image sensor for generating a near infrared image. In other words, the present image sensor is obtained by semiconductor manufacturing. It is hard to obtain such an image sensor and there is a problem that the cost of such an image sensor is higher than that of a usual image sensor at present.

An image capturing technique utilizing a configuration of a general image capturing device and which can perform image processing of a visible light region and a near infrared region is expected to be developed.

The present invention is to solve the above-described problems and a main object of the present invention is to provide an image capturing technique utilizing a configuration of a general image capturing device and which can easily perform image processing of a visible light region and a near infrared region.

Solution to Problem

An aspect of the present invention to solve the above-described problems is an image capturing device including:
image data acquisition means which acquires image data which includes a periodic pattern of a near-infrared light; and
image processing means which acquires color signals of visible light components and near-infrared signals from the image data based on the periodic pattern.

An aspect of the present invention to solve the above-described problems is a signal separation device including:
image data acquisition means which acquires image data which includes a periodic pattern of a near-infrared light; and
image processing means which acquires near-infrared signals from the image data based on the periodic pattern.

An aspect of the present invention to solve the above-described problems is an image capturing method including:
acquiring image data which includes a periodic pattern of a near-infrared light; and
acquiring color signals of visible light components and near-infrared signals from the image data based on the periodic pattern.

Advantageous Effects of Invention

According to the present invention, an image processing of a visible light region and a near infrared region can be performed easily while utilizing a configuration of a general image capturing device.

BRIEF DESCRIPTION OF DRAWINGS

FIG. 11 is a photo sensor that incorporates a Bayer arrangement type optical filter.

FIG. 12 is a schematic view of a coded IR cut filter according to the second exemplary embodiment;

DESCRIPTION OF EMBODIMENTS

The following will describe the exemplary embodiments (1 to 7) of the present invention with reference to the drawings.

(First Exemplary Embodiment)

[Configuration]

Figure 7:
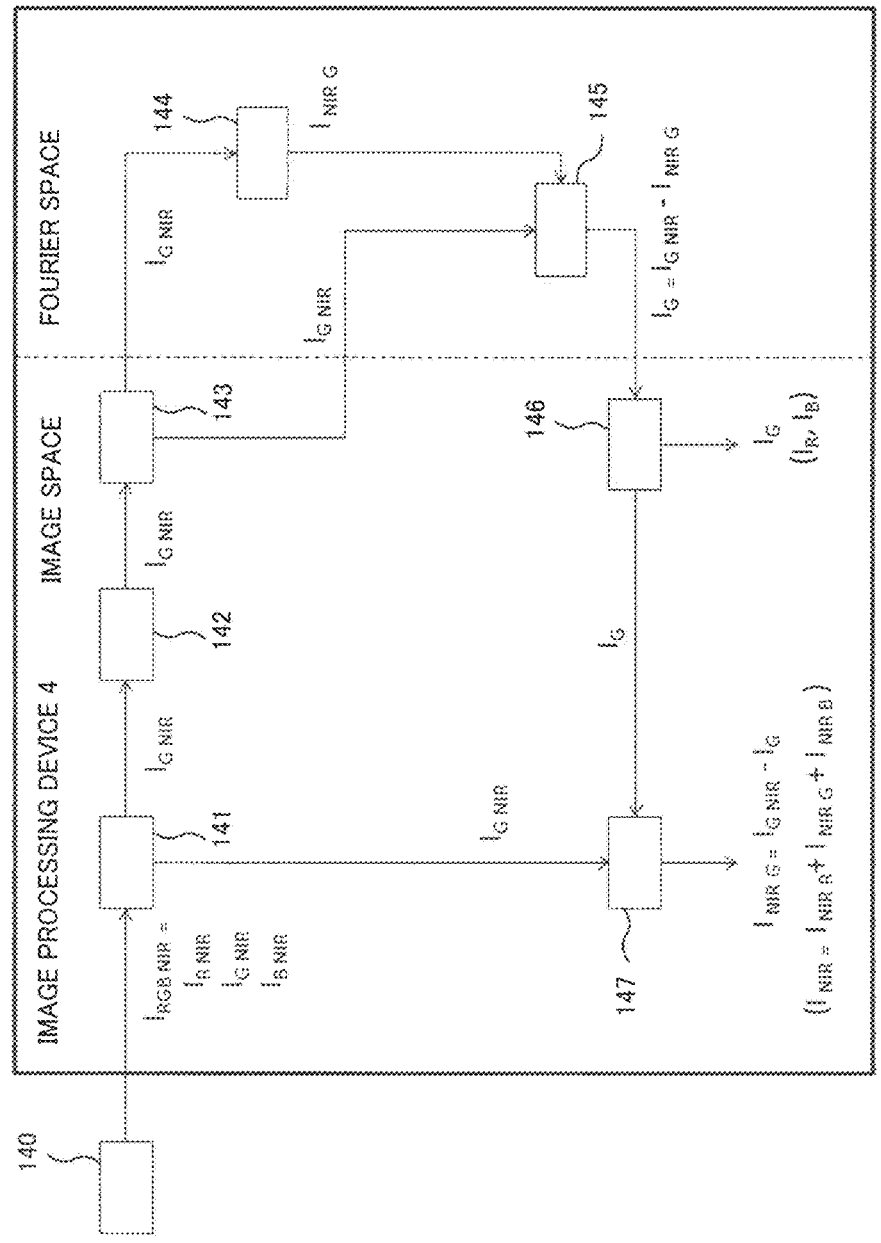
FIG. 7 is a functional block view of an image processing device according to a first exemplary embodiment.

FIG. 7 is a functional block view of an image processing device 4 according to the first exemplary embodiment of the present invention.

The image processing device 4 has an image data acquisition unit 141, a first color signal acquisition unit 142, a Fourier transform unit 143, a periodic pattern detection unit 144, a peak removing unit 145, a second color signal acquisition unit 146, and a near-infrared signal acquisition unit 147.

The image data acquisition unit 141 acquires image data from external means 140. The image data includes a plurality of color signals. In addition, the image data includes a periodic pattern of near-infrared light.

The first color signal acquisition unit 142 acquires a color signal (a first color signal) from the image data. The first color signal includes an apparent color signal (a second color signal) with a near-infrared signal.

The Fourier transform unit 143 transforms the first color signal to a signal in a frequency axis space by a two-dimensional Fourier transform. Hereinafter, the frequency axis space that was transformed by a two-dimensional Fourier transform may be referred to as a two-dimensional Fourier space. In this case, the first color signal includes a periodic pattern of near-infrared light. As the result, the near-infrared light shows peaks at specific frequencies in the two-dimensional Fourier space.

The periodic pattern detection unit 144 detects the peaks formed by the near-infrared light component at the specific frequency.

The peak removing unit 145 removes the peaks at the specific frequencies from the first color signal in the two-dimensional Fourier space. The information after removal of the peaks is a second color signal in the two-dimensional Fourier space.

The second color signal acquisition unit 146 performs an inverse Fourier transform on the information, from which the peaks have been removed, to acquire the transformed second color signal. In other words, the second color signal is a color signal of only a visible light component that does not include near-infrared light.

The near-infrared signal acquisition unit 147 acquires a near-infrared signal by subtracting the second color signal from the first color signal. Further, a near-infrared signal is acquired for each of a plurality of color signals, whereby NIR image data is generated.

In general, a Fourier transform transforms a signal on a time axis into a signal in a frequency axis space. On the other hand, a Fourier transform on an image space transforms a signal on a space coordinate axis to a signal on a wave number space axis.

A period is, in general, a certain repetitive time period. In the first exemplary embodiment, a period is applied to a certain repetitive space.

[Operation]

The operation according to the above configuration will be described.

First, the image data acquisition unit 141 acquires image data for all the pixels. In the image data, R, G, B color information is set for all the pixels. Further, the R, G, B color information includes near-infrared light component with a specific frequency pattern.

In the first exemplary embodiment, NIR image data is extracted and generated from image data, in which R, G, B color information is set for all the pixels, by the following filtering processing. The following will describe the details.

The first color signal acquisition unit 142 selects a color signal (a first color signal) from a plurality of color signals (R, G, B). For example, the first color signal acquisition unit 142 selects a first color signal $I_{G\_NIR}$ relating to a G component.

The Fourier transform unit 143 transforms the first color signal into a two-dimensional Fourier space.

Figure 8:
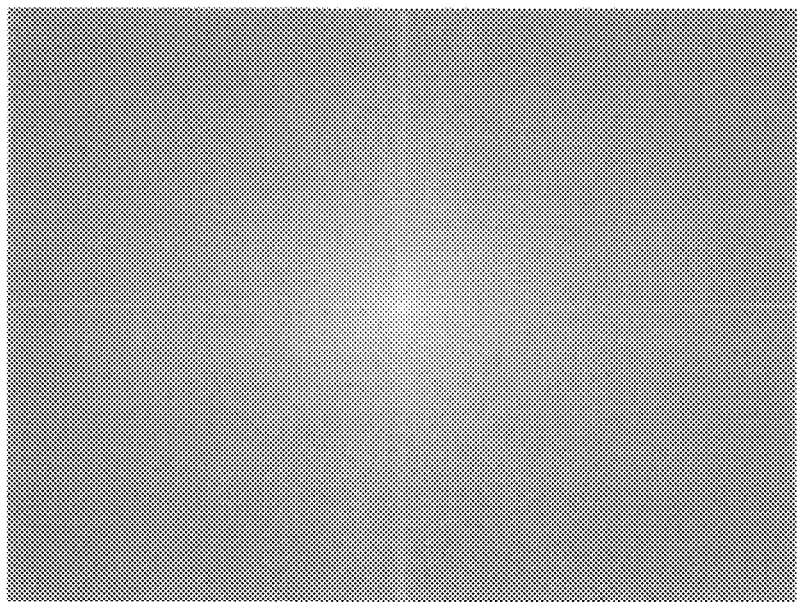
FIG. 8 is a comparison example representing the intensity of signals of image data of a natural scene in a two-dimensional Fourier space.

FIG. 8 is a diagram illustrating a comparison example of a Fourier transform. In FIG. 8, image data of a certain natural scene is acquired and a two-dimensional discrete Fourier transform is applied to first color signals relating to a G component, then, the intensity of signals in the two-dimensional Fourier space is expressed. In this case, the acquired image data is image data that was captured using a normal IR cut filter, and the intensity of the signals at each frequency, as illustrated in FIG. 8, is only by the visible light components which do not include a near-infrared light component. Thus, a periodical pattern is not observed.

Figure 9:
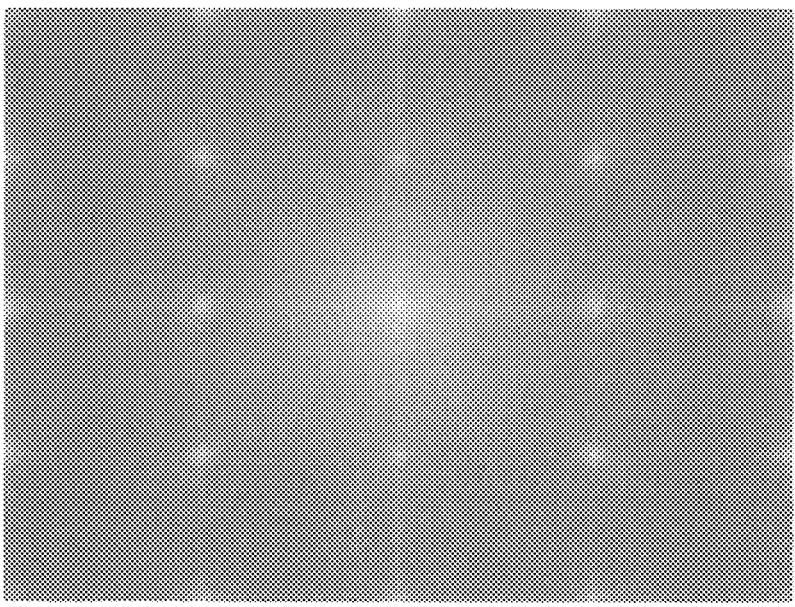
FIG. 9 is an example representing the intensity of signals of image data of the same scene in a two-dimensional Fourier space, including a periodic pattern of near-infrared light.

FIG. 9 is an example of a Fourier transform. In FIG. 9, image data of the same scene as FIG. 8 is acquired and a two-dimensional discrete Fourier transform is applied to first color signals relating to a G component, then, the intensity of signals in the two-dimensional Fourier space is expressed. In this case, the image data includes a periodic pattern of near-infrared light. As the result, the near-infrared light shows peaks at specific frequencies in the two-dimensional Fourier space as illustrated in FIG. 9. Thus, the intensity of the signals at each frequency is caused by the visible light components and the near-infrared light component.

The intensities of the signals in the Fourier spaces as illustrated in FIGS. 8 and 9 are different depending on whether the signals include near-infrared light that forms a periodic pattern. In the Fourier space illustrated in FIG. 9, peaks with specific frequencies are observed in the intensity of the signals. Thus, it is understood that peaks with the periodic pattern are caused by the near-infrared light component.

Next, the peak removing unit 145 removes the intensity of the signals at the specific frequencies where the peaks of the near-infrared light are formed in the Fourier space. Here, in a state where the intensity of signals at a specific frequency is removed in the Fourier space, and, thus, the intensity of the signals at frequencies around the specific frequency becomes discontinuous, if an inverse Fourier transform is performed to transform the signals to apparent image data, unnatural artifacts, such as ringing, is generated. To prevent such a problem, a Butterworth filter is used.

The transfer function H(s) of the Butterworth filter (Laplace transform) is as follows when s=jω and the filter order n=1:

$$|H(\omega)| = \frac{1}{\sqrt{1+(\omega/\omega_c)^2}} \quad (1)$$

Here, ω represents all the frequencies and $\omega_c$ represents a frequency, of which peak is to be removed. This transfer function is applied to a specific frequency where a peak occurs in a Fourier space (filtering only for the specific frequency) so as to remove the peak while suppressing discontinuation of the intensity of signals at the specific frequency and therearound.

The second color signal acquisition unit 146 performs, by the Butterworth filter, an inverse Fourier transform on the result of removing the intensity of the signals at the specific frequency where the peak of near-infrared light occurs. In this way, image data constituted of a color signal $I_G$ of only a visible light component that do not include near-infrared light is obtained.

Further, the near-infrared signal acquisition unit 147 acquires image data $I_{NIR\_G}$ of only NIR by subtracting the image data $I_G$ from the image data $I_{G\_NIR}$ of a G signal that includes NIR as expressed by the equation (2):

$$I_{NIR\_G} = I_{G\_NIR} - I_G \quad (2)$$

As above, a case of selecting a first color signal relating to a G component has been described. A second color signal $I_R$ of only a visible light component that does not include near-infrared light and image data $I_{NIR\_R}$ of only NIR can be obtained by selecting a first color signal relating to an R component and repeating the above operation. Similarly, a second color signal $I_B$ of only a visible light component that does not include near-infrared light and image data $I_{NIR\_B}$ of only NIR can be obtained by selecting a first color signal relating to a B component and repeating the above operation.

Thus, for each color channel of image data, in which R, G, B color information is set for all the pixels that were generated by demosaicing processing, image data $I_R$, $I_G$, $I_B$ including only R, G, B color signals and image data $I_{NIR\_R}$, $I_{NIR\_G}$, $I_{NIR\_B}$ of only NIR are obtained.

The image data $I_{NIR}$ of only NIR is as follows:

$$I_{NIR} = I_{NIR\_R} + I_{NIR\_G} + I_{NIR\_B} \quad (3)$$

By the above processing, image data $I_R$, $I_G$, $I_B$, $I_{NIR}$ are generated from the image data including a periodic pattern of near-infrared light.

[Advantageous Effect]

In the related techniques, image processing in a visible light region and a near-infrared region is performed by a unique mechanical configuration.

In the first exemplary embodiment, image data in a visible light region and a near-infrared region can be acquired by image processing the image data including a periodic pattern of near-infrared light.

That is, according to the first exemplary embodiment, an advantageous effect that the unique mechanical configuration is not necessary, and an image processing of a visible light region and a near infrared region can be performed easily while utilizing a configuration of a general image capturing device.

(Second Exemplary Embodiment)

[Configuration]

Figure 10:
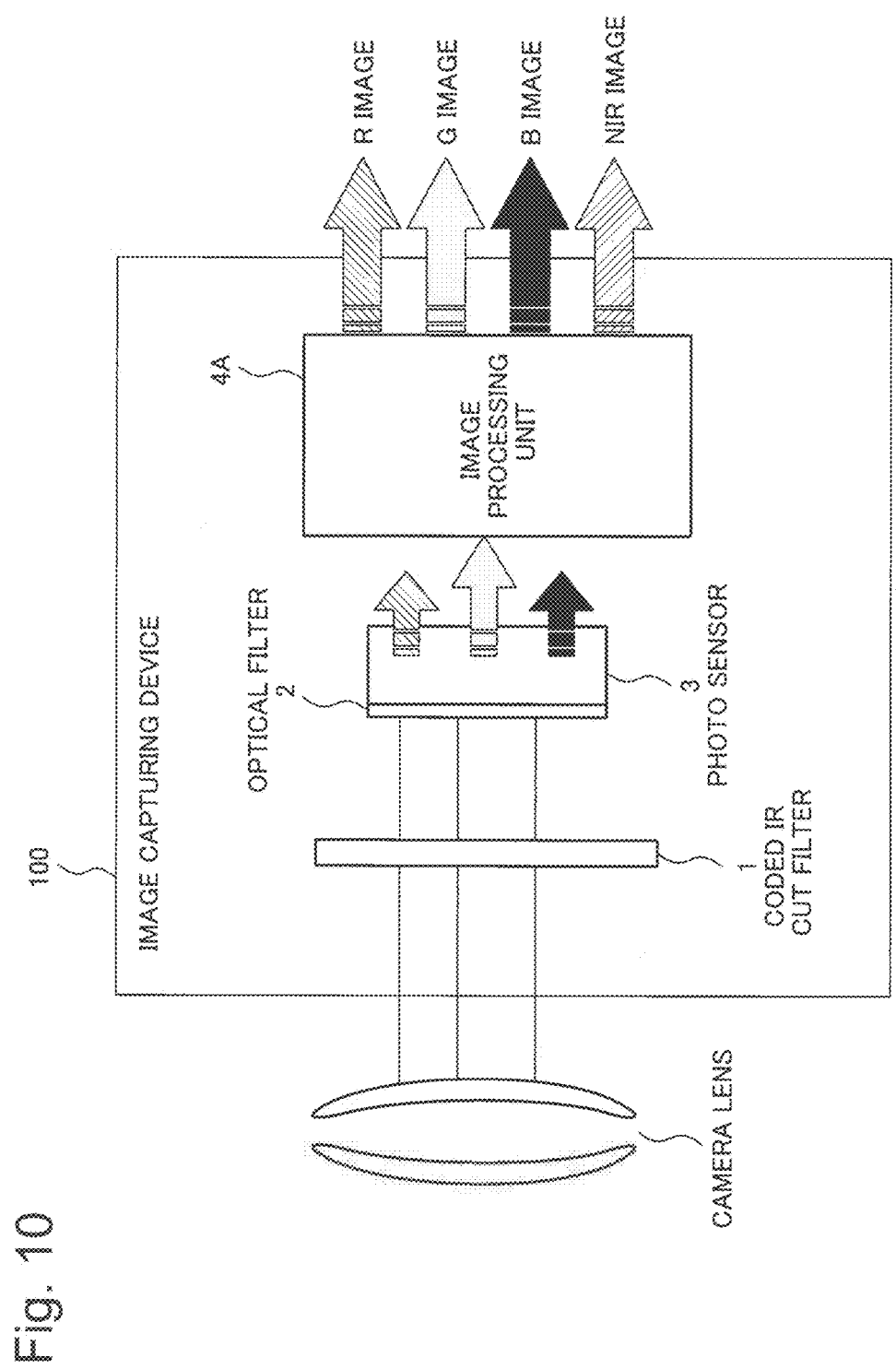
FIG. 10 is a schematic configuration view of an image capturing device according to a second exemplary embodiment.

FIG. 10 is a schematic configuration view of an image capturing device 100 according to a second exemplary embodiment of the present invention.

Figure 1:
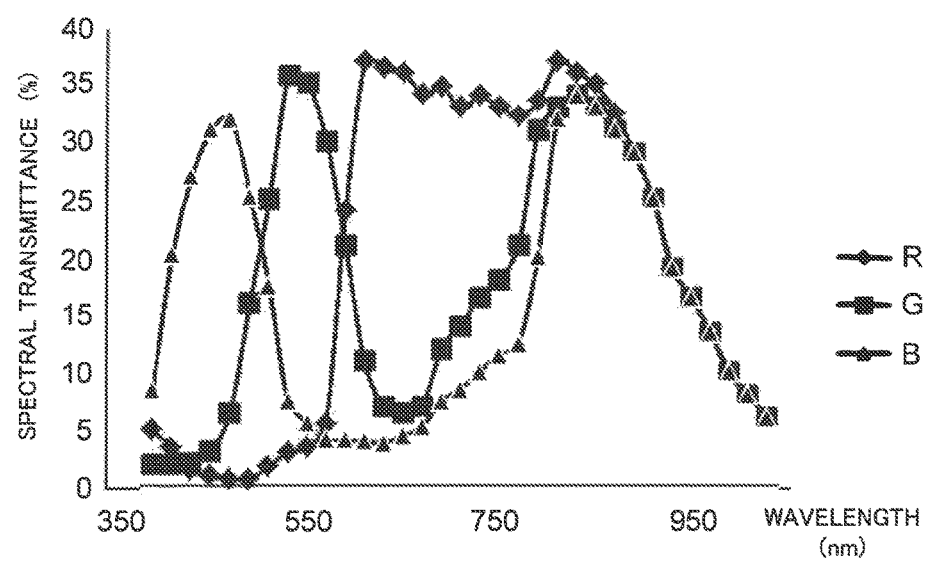
FIG. 1 is an example illustrating a spectral transmissivity of an RGB three-color optical filter.
Figure 2:
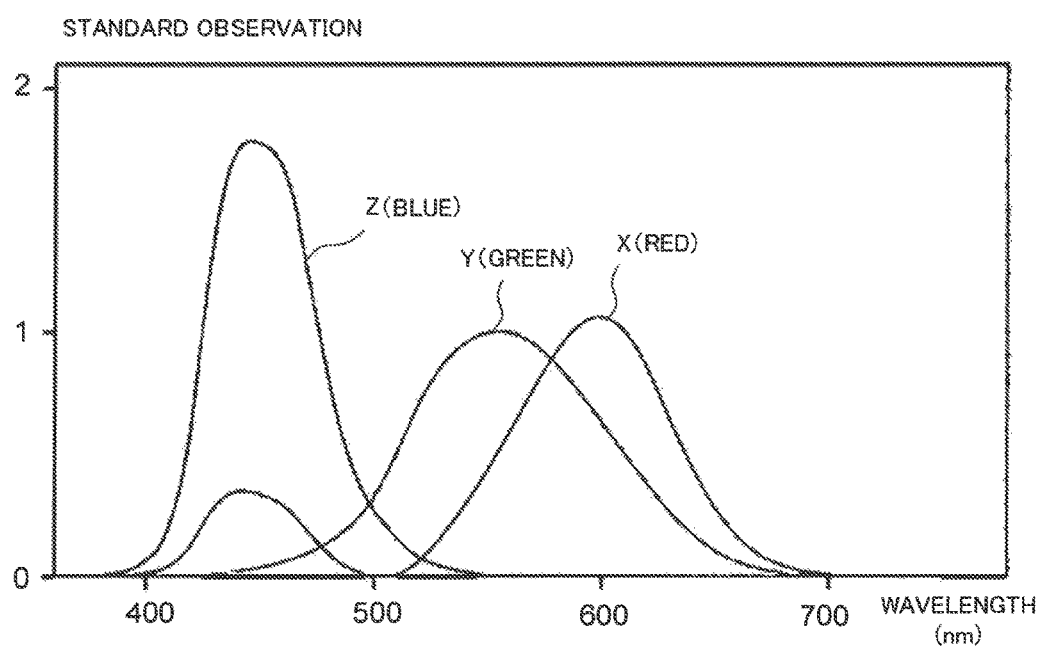
FIG. 2 is a color-matching function of an XYZ color system relating to the color perception of human beings.
Figure 3:
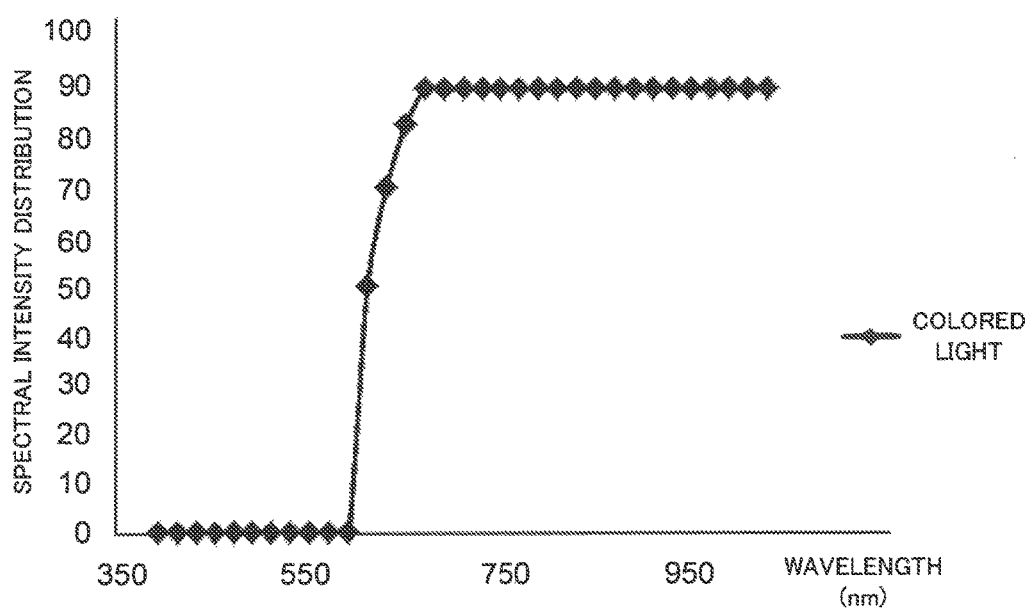
FIG. 3 is a spectrum intensity distribution of color light illustrated as a reference.
Figure 4:
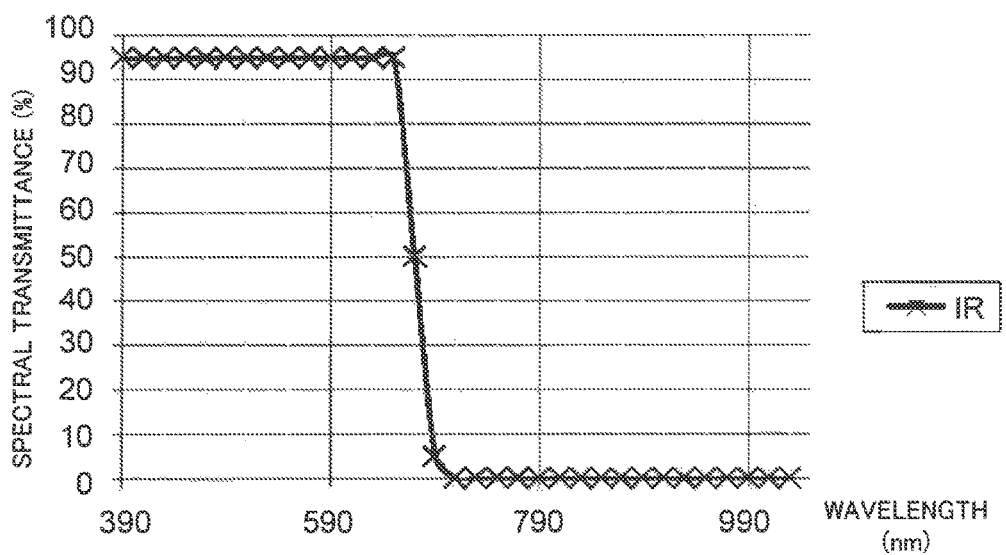
FIG. 4 is an example of a spectral transmissivity of an IR cut filter.

The image capturing device 100 according to the second exemplary embodiment of the present invention includes a coded IR cut filter 1, an optical filter 2, a photo sensor 3, and an image processing unit 4A. An usual camera lens may be used for the optical filter 2 and the photo sensor 3, an optical filter and a photo sensor which is currently generally used in a color image input device (or an image capturing device). In other words, the spectral characteristics of the optical filter 2 are similar to FIG. 1.

FIG. 11 is a diagram schematically illustrating the optical filter 2 and the photo sensor 3. The three-color arrangement composed of R, G, and B in the optical filter 2 illustrated in FIG. 11 is referred to as Bayer arrangement type. Any one color of R, G, B is assigned to one pixel of a photo sensor 3 to correspond to R, G or B in the optical filter 2.

FIG. 12 is a schematic view of the coded IR cut filter 1. The coded IR cut filter 1 is a filter to which two patterns which are a portion (infrared cut unit 11) cutting a near-infrared light (NIR) and a portion (infrared transmissive units 12) passing the near-infrared light are applied. In other words, the coded means two values, passing and cutting.

The infrared transmissive units 12 are regularly arranged while maintaining periodicity, in a direction such as a vertical direction, a horizontal direction, a diagonal direction, and a concentric shape, in the coded IR cut filter 1. It should be noted that the size and shape of the infrared transmissive unit do not necessarily match the size and shape of one pixel of a photo sensor.

The coded IR cut filter 1 is provided in front of the optical filter 2 in the light traveling direction, which causes diffraction of near-infrared light (as will be described later).

A light which has passed through the coded IR cut filter 1 and the optical filter 2 is converted into three color signals R, G and B t at the photo sensor 3 and output as image data.

Through these coded IR cut filter 1, optical filter 2, and photo sensor 3, image data with a periodic pattern of near-infrared light is generated.

The image processing unit 4A generates image data composed of four color signals for R, G, B, and NIR based on the image data composed of three color signals for R, G, and B. The detailed processing contents are the same as the image processing device 4 of the first exemplary embodiment.

[Operation]

Next, the operation of the image capturing device 100 will be described. An incident light to the image capturing device 100 through a camera lens is separated into a light in which a near infrared light is cut and a light including a near infrared light by the coded IR cut filter 1. The separated two types of lights are made incident on the photo sensor 3 into which the optical filter 2 of R, G, B Bayer arrangement type.

Figure 13:
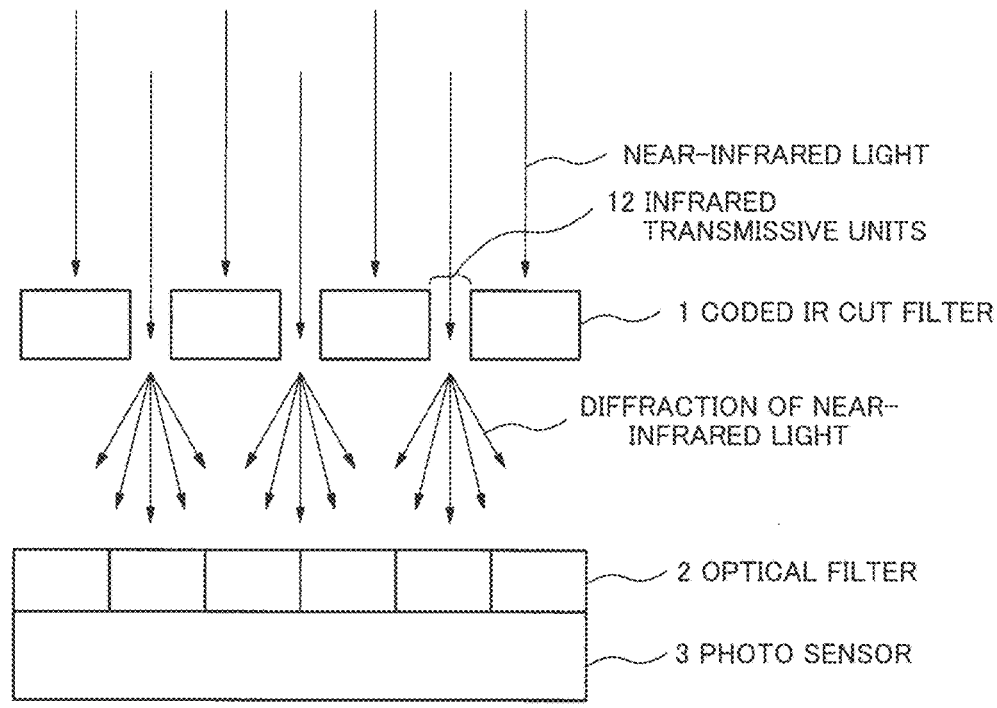
FIG. 13 is a diagram representing how near-infrared light behaves in a coded IR cut filter.

FIG. 13 represents the behavior of the near-infrared light when the near-infrared light passes the infrared transmissive unit 12 of the coded IR cut filter 1. The near-infrared light that was passed through the infrared transmissive unit 12 of the coded IR cut filter, is diffused by diffraction and enters into the optical filter 2 and the photo sensor 3.

The incident light of the optical filter 2 includes visible light and near-infrared light that was diffused by the infrared transmissive unit 12 of the coded IR cut filter 1.

Then, R, G, B signals that include a near-infrared light component are generated at the photo sensor 3 from the light that was passed each filter of the optical filter 2 (visible light and near-infrared light). Here, the near-infrared light component is expressed as NIR.

The image processing unit 4A applies demosaicing processing and filtering processing on the image data $I_{RGB\_NIR}$ that is constituted of three color signals for R, G, B including NIR that were output by the photo sensor 3 to generate R, G, B, NIR four-channel image data. Here, the acquired image data $I_{RGB\_NIR}$ includes a periodic pattern of near-infrared light.

Figure 14:
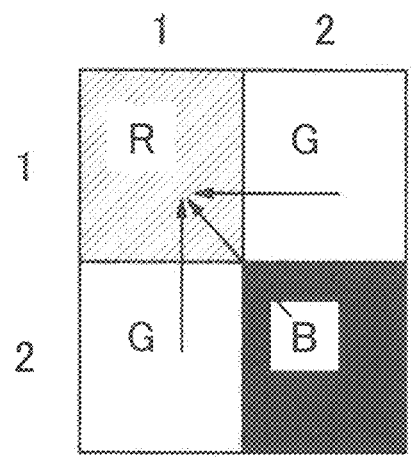
FIG. 14 is an example of characteristic demosaicing processing.

First, with reference to FIG. 14, an example of demosaicing processing to be applied to the image data $I_{RGB\_NIR}$ that is constituted of R, G, B color signals including NIR that were output by the photo sensor 3 will be described. As illustrated in FIGS. 11 and 14, each pixel included in the image has coordinate values in X-Y coordinates.

First, the image processing unit 4A acquires image data (R, G, B color information) of a pixel of a coordinate value (1, 1). Here, although the R, G, B color information at this point includes NIR information, the following description will be made using R, G, B color information to simplify the explanation.

As the pixel of the coordinate value (1, 1) corresponds to R, the image processing unit 4A directly acquires an R value.

$R(1, 1)32 R(1, 1)$

The image processing unit 4A calculates a G value and a B value which are absent in the pixel of the coordinate value (1, 1) by, for example, interpolating from color information of its neighboring pixel as described below.

$G(1, 1)=(G(2, 1)30 G(1, 2))/2$ $B(1, 1)=B(2, 2)$

Next, the image processing unit 4A acquires image data (R, G, B color information) of a pixel of a coordinate value (1, 2). Since the pixel of the coordinate value (1, 2) corresponds to G, the image processing unit 4A directly acquires a G value.

$G(1, 2)=G(1, 2)$

The image processing unit 4A also calculates an R value and a B value which are absent in the pixel of the coordinate value (1, 2) by interpolating from color information of its neighboring pixel in a similar manner to the above.

$R(1, 2)=R(1, 1)$ $B(1, 2)=B(2, 2)$

The image processing unit 4A repeats the above-described processing to acquire image data (R, G, B color information) for all pixels. The demosaicing processing is not limited to the above-described method, and a variety of method described in NPLs 3 to 5 may be used Next, the image processing unit 4A extracts and generates NIR image data from the image data, in which R, G, B color information is set for all the pixels, by filtering processing.

The detailed operation is the same as the operation of the first exemplary embodiment. The operation that is characteristic to the second exemplary embodiment will be described.

As illustrated in FIG. 13, the near-infrared light that was passed through the infrared transmissive unit 12 of the coded IR cut filter 1, is diffused by diffraction that occurs when the near-infrared light passes through the infrared transmissive unit 12 and irradiated to the optical filter 2 and the photo sensor 3. In general, this diffraction is a complex pattern, influencing the pixels of the photo sensor 3 in a complex manner. Thus, the method of extracting only an NIR component from R, G, B color signals including the NIR component is also complex.

In the second exemplary embodiment, the infrared transmissive units 12 of the coded IR cut filter 1 are arranged in a pattern that maintains regular periodicity. In this way, the near-infrared light passed through the infrared transmissive units 12 are diffracted, forming a pattern that of a specific frequency on the surfaces of the optical filter 2 and the photo sensor 3. This periodic pattern is appended to the visible light components and reflected to the image data.

Here, since the visible light components are not influenced by the infrared transmissive units 12 of the coded IR cut filter 1, the information of the captured scene is irradiated as is to the optical filter 2 and the photo sensor 3 and formed as image data constituted of three color signals for R, G, B. Thus, the component of a specific frequency pattern that is appended to the image data constituted of three color signals for R, G, B is the near-infrared light component.

In the second exemplary embodiment, the peak of the near-infrared light is removed in the Fourier space using a characteristic where the peak is formed by the near-infrared light component at a specific frequency.

In the second exemplary embodiment, the infrared transmissive units 12 of the coded IR cut filter 1 are arranged in a pattern that maintains regular periodicity. Accordingly, the specific frequency where the peak occurs in the Fourier space is determined by the size, shape, and pattern of the infrared transmissive units 12 of the coded IR cut filter 1 and a distance between the coded IR cut filter 1 and the photo sensor 3. As such, the frequency is easily determined, in advance, by calibration.

The specific frequency where the peak occurs in the Fourier space can otherwise be determined without calibration. In other words, the image processing unit 4A estimates an image formed by near-infrared light on the sensor surface using a method of modeling a light diffraction phenomenon and determines the specific frequency where the peak occurs in the Fourier space by applying a Fourier transform to the image. As the modeling of a light diffraction phenomenon, for example, the following Rayleigh-Sommerfeld integral expression can be used:

$$U_2(r_2) = \frac{kz_1}{i2\pi} \int U_i(r_1) \frac{e^{ik\rho}}{\rho^2} \left(1 - \frac{1}{ik\rho}\right) dr_1 \quad (4)$$

where $$\rho = \sqrt{(r_2 - r_1)^2 + z_1^2},$$

$$k = \frac{2\pi}{\lambda}$$

$U_2$ represents a waveform intensity distribution plane at a distance $z_1$ from the plane $U_1$ of the coded IR cut filter 1. $U_2$ is defined as an intensity distribution on the image plane. λ is a wavelength and k is a wave number. $r_1$ is a distance from the axis of a hole in the coded IR cut filter 1 and $r_2$ is a distance from the image plane. Thus, the image formed by the near-infrared light on the sensor surface can be obtained using the method of modeling a light diffraction phenomenon by the above equation.

[Advantageous Effect]

The image capturing device 100 of the second exemplary embodiment is obtained by adding the coded IR cut filter 1 to a configuration of a general image capturing device (see FIG. 5), the optical filter 2 and the photo sensor 3. The coded IR cut filter 1 has a simple configuration obtained by a simple modification of a general IR cut filter. In other words, only adding a simple configuration to a configuration similar to a related art, image processing of a visible light region and a near infrared region becomes possible.

As a result, according to the second exemplary embodiment, an advantageous effect that the image capturing device 100 can be produced in a large amount at low costs can be provided. Further, since an additional configuration is simple, the imaging device 100 can provide an advantageous effect of causing little failure.

As a further advantageous effect, even under the circumstance where near-infrared light is strongly saturated, the saturation can be suppressed by diffracting and separating the near-infrared light, widening an apparent dynamic range.

[Variations]

In the description of generation of R, G, B, NIR image data $I_R$, $I_G$, $I_B$, $I_{NIR}$ in the second exemplary embodiment, image data of R, G, B color signals, which is imaged using the coded IR cut filter 1, is used.

On the other hand, in a case of using an RGB Bayer arrangement type, since the G channel information is twice as much as other color channels, a method of using only the G channel after demosaicing processing can be used to generate NIR image data.

In other words, although the R signal image data $I_{R\_NIR}$ and B signal image data $I_{B\_NIR}$ after demosaicing processing include NIR information to the strict sense, the NIR information can be ignored as it is minute. That is, $I_{R\_NIR}$ can be considered as the R signal image data $I_R$, and $I_{B\_NIR}$ can be considered as the B signal image data $I_B$.

Then, the image data $I_{NIR}$ of only NIR is as follows:

$$I_{NIR} = I_{NIR\_G} \quad (5)$$

It should be noted that the G signal image data IG is as described above.

In particular, depending on the size, shape, arrangement of the coded IR cut filter 1, the R signal image data $I_{NIR\_R}$ and B signal image data $I_{NIR\_B}$ after demosaicing processing can be ignored with little influence. That is, if the size and shape of the coded IR cut filter 1 correspond to the size and shape of one pixel of the optical filter and the photo sensor, and the infrared transmissive units 12 are arranged so as to correspond to the pixels relating to a G component, ignoring as described above has little influence.

(Third Exemplary Embodiment)

Figure 15:
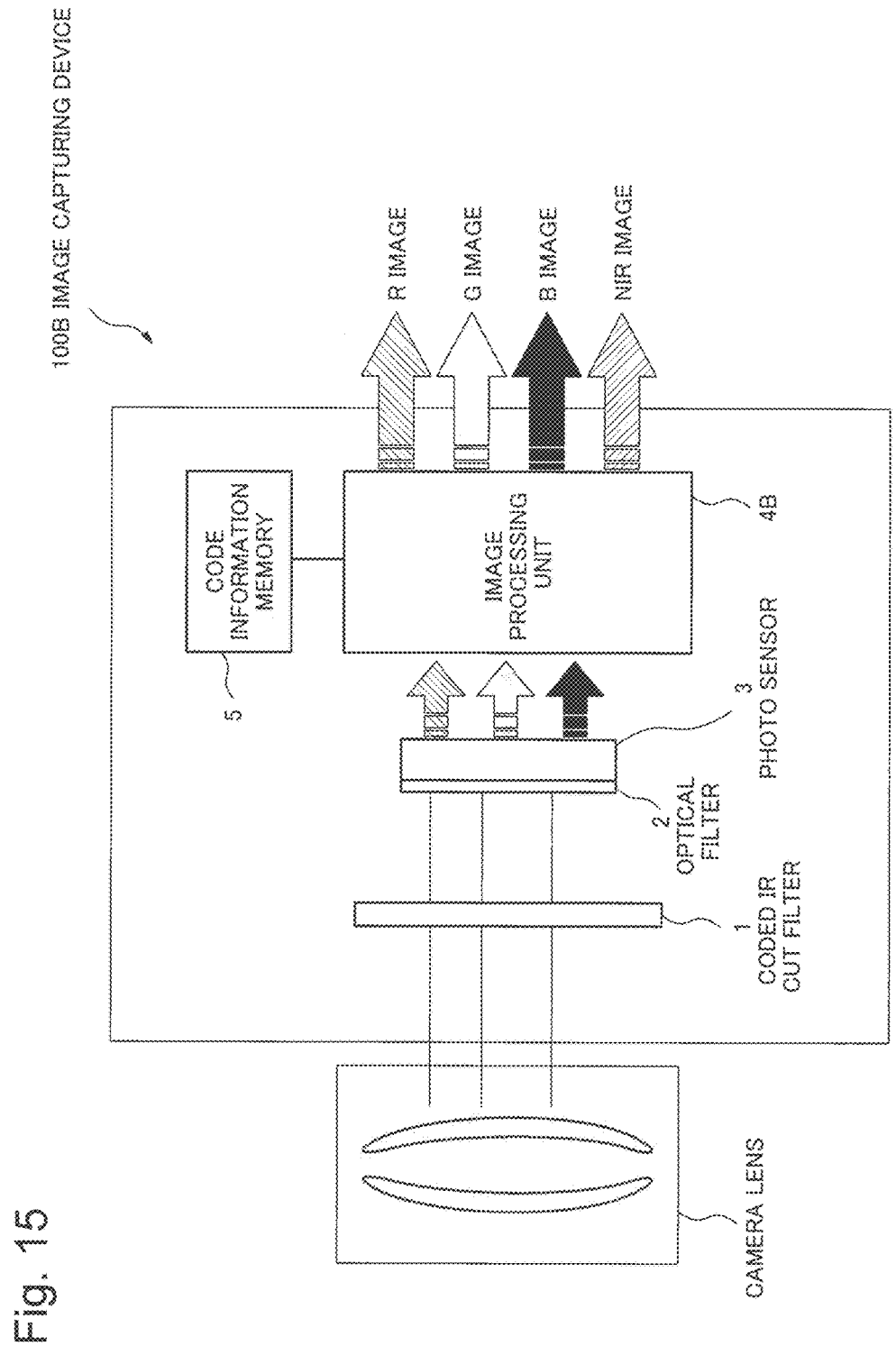
FIG. 15 is a schematic configuration view of an image capturing device according to a third exemplary embodiment.

FIG. 15 is a schematic configuration view of an image capturing device 100B according to another exemplary embodiment.

The image capturing device 100B has a configuration of the image capturing device 100 illustrated in FIG. 10 with additional code information memory 5. The code information memory 5 is connected to the image processing unit 4B. It should be noted that the coded IR cut filter 1, optical filter 2, and photo sensor 3 are the same as those of the image capturing device 100, thus, the following will describe only the code information memory 5 and image processing unit 4B.

The code information memory 5 records a set of a frequency component at a peak in the Fourier space representing a periodic pattern that is formed by near-infrared light.

The diffraction that occurs when the near-infrared light is passed through the infrared transmissive units 2 which are arranged in a pattern which maintains regular periodicity in the coded IR cut filter 1, forms a periodic pattern on the photo sensor 3. The pattern is recorded in the image data as color signals. This periodic pattern is determined by the thickness of the coded IR cut filter 1, the wavelength of near-infrared light, a distance between the coded IR cut filter 1 and the photo sensor 3. Thus, the specific frequency to be recorded in the code information memory 5 can be obtained by performing calibration in advance. Alternatively, a method of modeling a light diffraction phenomenon may otherwise be used.

The image processing unit 4B applies demosaicing processing on the image data $I_{RGB}$ that is constituted of R, G, B color signals in the same way as the image processing unit 4A and acquires image data (R, G, B color information) for all the pixels.

Then, the image processing unit 4B applies filtering processing on image data that is constituted of three color signals for R, G, B generated by demosaicing processing to generate image data of R, G, B, NIR four channels. Here, the image processing unit 4B generates image data $I_{RGB}$ constituted of R, G, B color signals and image data $I_{NIR}$ constituted only of NIR, by using the frequency that has a peak of the near-infrared light in the Fourier space and is recorded in the code information memory 5.

The third exemplary embodiment has the same configuration as the second exemplary embodiment and provides the same advantageous effect. Further, according to the third exemplary embodiment, the peak of the near-infrared light in the Fourier space can be easily removed.

(Fourth Exemplary Embodiment)

In the second and third exemplary embodiments, the present invention is applied to an image capturing device in which a light is separated by a Bayer arrangement type optical filter, but the present invention is not limited thereto. For example, the present invention can also be applied to a three-plate type image capturing device.

Figure 16:
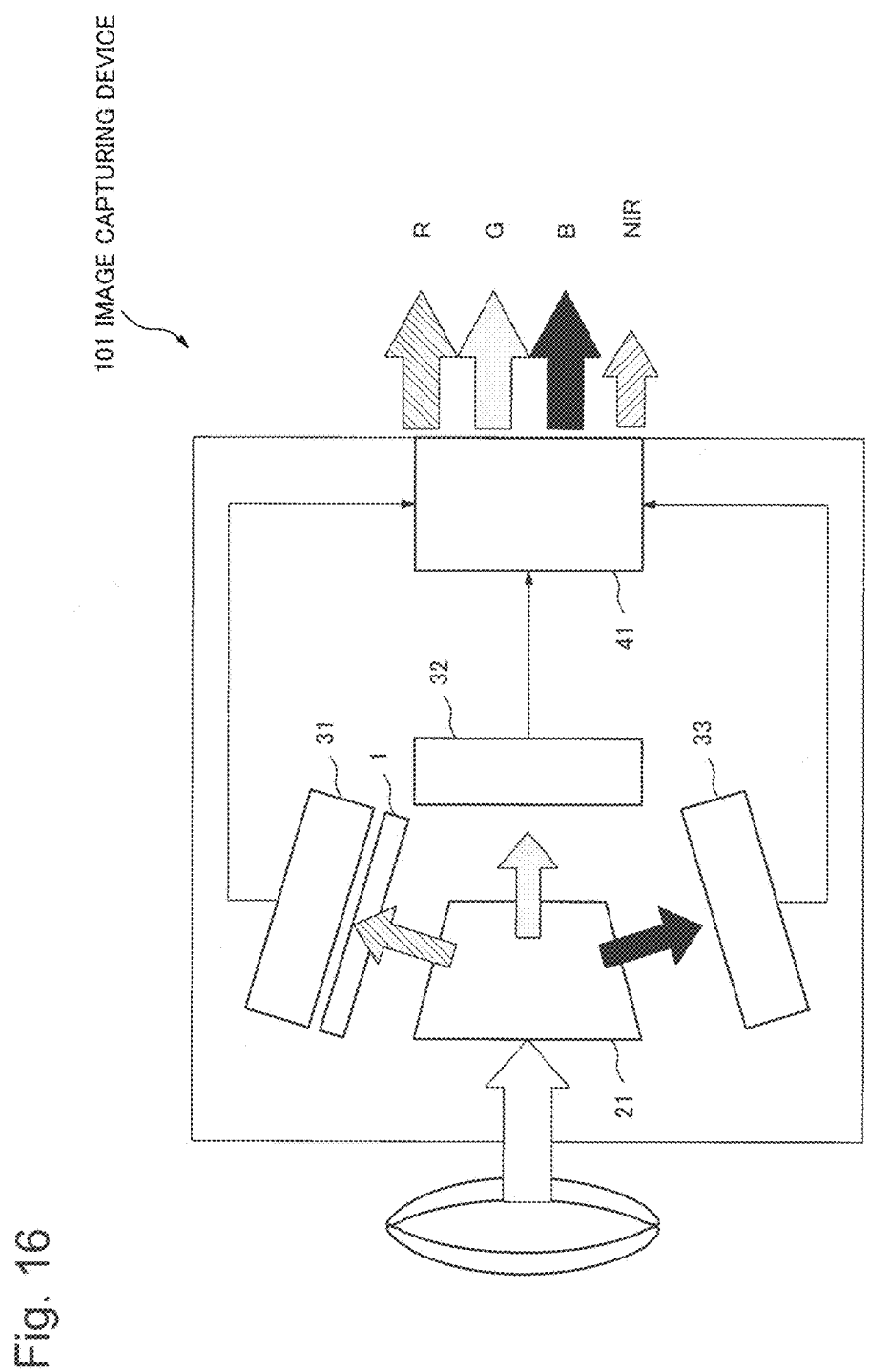
FIG. 16 is a schematic configuration view of an image capturing device according to a fourth exemplary embodiment.

FIG. 16 is a schematic configuration view of an image capturing device 101 according to an exemplary embodiment of the present invention.

The image capturing device 101 which is another exemplary embodiment of the present invention includes a coded IR cut filter 1, a prism (color separation unit) 21, sensors 31 to 33, and an image processing unit 41. A usual camera lens may be used. For the prism 21 and sensors 31 to 33, a prism and photo sensors which are currently generally used in a three-plate type image capturing device may be used.

The coded IR cut filter 1 which is used in the second and third exemplary embodiments is applied.

The coded infrared cut filter 1 is provided in front of at least one of the sensors 31 to 33 in the light traveling direction. One example, FIG. 16 illustrates a configuration in which the coded infrared cut filter 1 is provided relating to the sensor 31 which corresponds to R, which causes diffraction of near-infrared light.

A normal infrared cut filter may be provided to the remaining two sensors in which a coded infrared cut filter is not provided in order to cut a near infrared light which can leak from the prism 21 in consideration of the color reproduction. Here, the description will be made assuming that lights of G and B separated in the prism 21 do not include a near infrared light.

An incident light to the image capturing device 101 through a camera lens is separated by the prism 21 into lights of R, G, and B whose bands of wavelength are different. A light corresponding to R is made incident on the sensor 31, a light corresponding to G is made incident on the sensor 32, and a light corresponding to B is made incident on the sensor 33.

At this time, a light corresponding to R, near-infrared light is diffracted by the infrared transmissive units 12 of the coded IR cut filter 1, from which the sensor 31 generates R image data including NIR. That is, image data including a periodic pattern of near-infrared light is formed through the coded IR cut filter 1, the prism 21, and the sensor 31.

The image processing unit 41 generates image data of only R, based on the equation (1) with the R image data including NIR that was output by the sensor 31 as input. The image processing unit 41 generates image data of only NIR by subtracting image data of only R from the R image data including NIR. As such, the image processing unit 41 acquires image data (R, NIR) for all the pixels.

Further, the image processing unit 41 acquires the image data (G) for all the pixels based on the image data that was output by the sensor 32. The image processing unit 41 further acquires the image data (B) for all the pixels based on the image data that was output by the sensor 33.

As such, the image processing unit 41 acquires image data (R, G, B, NIR) for all the pixels.

The image capturing device 101 of the fourth exemplary embodiment is obtained by adding the coded IR cut filter 1 to a configuration of a general three-plate type image capturing device, the prism 21 and the photo sensors 31 to 33. The coded IR cut filter 1 has a simple configuration obtained by a simple modification of a general cut filter. In other words, an advantageous effect that only adding a simple configuration to a configuration similar to a related art, image processing of a visible light region and a near infrared region becomes possible, whereby reduction of production cost and reduction of malfunctions can be expected can be provided.

Further, according to the fourth exemplary embodiment, even under the circumstance where near-infrared light is strongly saturated, the saturation can be suppressed by diffracting and separating the near-infrared light, widening an apparent dynamic range.

(Fifth Exemplary Embodiment)

In the second and third exemplary embodiments, the present invention is applied to an image capturing device in which a light is separated by a Bayer arrangement type optical filter, but the present invention is not limited thereto. For example, the present invention can also be applied to an image capturing device including a layered sensor.

Figure 17:
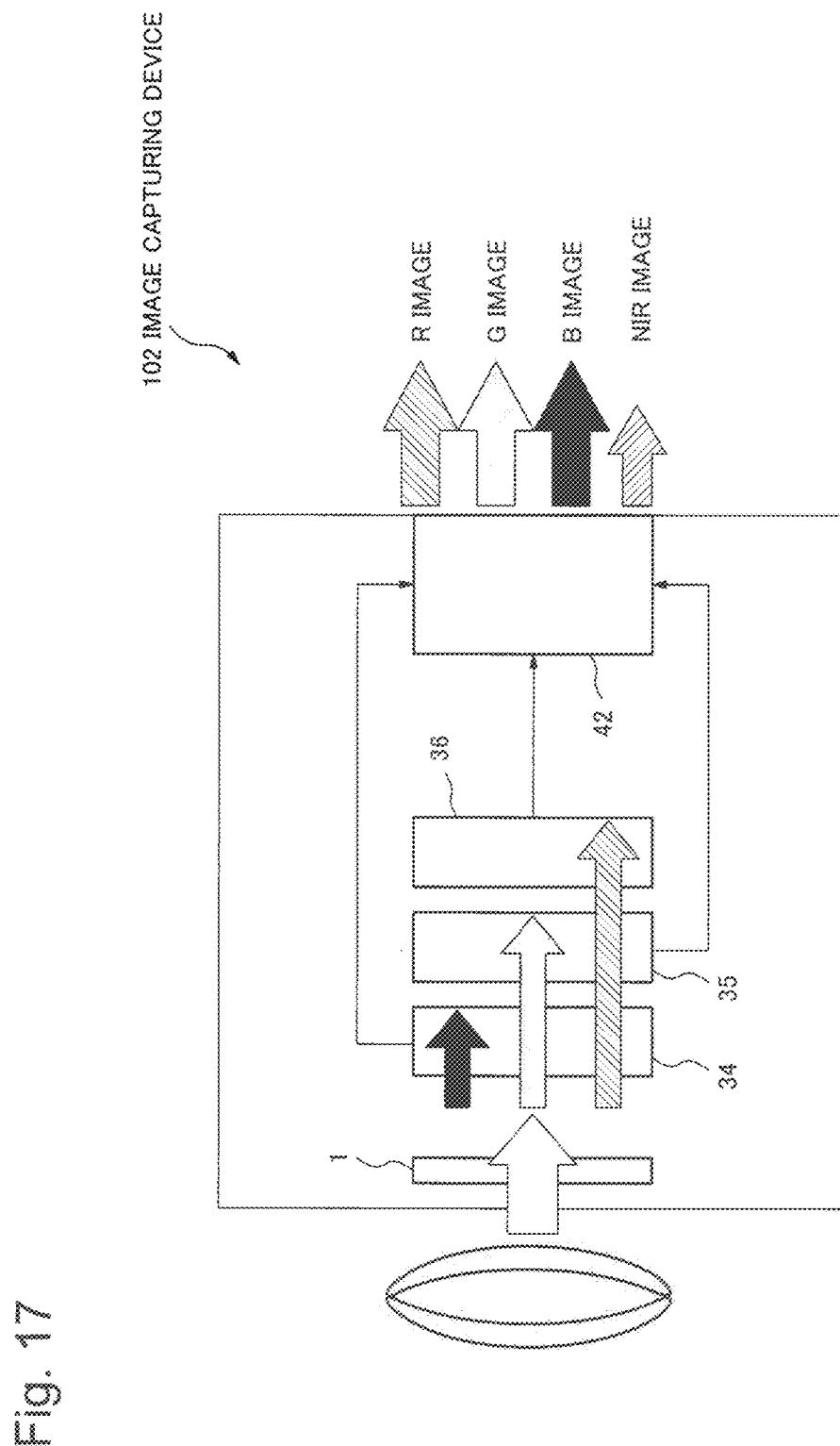
FIG. 17 is a schematic configuration view of an image capturing device according to a fifth exemplary embodiment.

FIG. 17 is a schematic configuration view of an image capturing device 102 according to an exemplary embodiment of the present invention.

The image capturing device 102 which is another exemplary embodiment of the present invention includes a coded IR cut filter 1, a layered sensor in which sensors 34 to 36 are stacked, and an image processing unit 42. A usual camera lens may be used. For the sensors 34 to 36, a layered sensor which is currently generally used in a sensor type image capturing device may be used.

The layered sensor is layered in the order of sensors 34, 35, and 36 in the light traveling direction. The sensor 34 is sensitive to a band of wavelength of B, the sensor 35 is sensitive to a band of wavelength of G, and the sensor 36 is sensitive to a band of wavelength of R.

The coded IR cut filter 1 which is used in the second and third exemplary embodiments is applied.

The coded infrared cut filter 1 is provided in front of the layered sensor in the light traveling direction.

An incident light to the image capturing device 102 through a camera lens includes lights of R, G, B and NIR whose bands of wavelength are different. A light corresponding to B is converted to a signal by the sensor 34, a light corresponding to G is converted to a signal by the sensor 35, and a light corresponding to R and NIR is converted to a signal by the sensor 36.

At this time, a light corresponding to R, near-infrared light is diffracted by the infrared transmissive units 12 in the coded IR cut filter 1, from which the sensor 36 generates R image data which includes NIR. That is, image data including a periodic pattern of near-infrared light is formed through the coded IR cut filter 1 and the sensor 36.

The image processing unit 42 generates image data of only R based on the equation (1) with the R image data including NIR that was output from the sensor 36 as input. The image processing unit 42 generates image data of only NIR by subtracting image data of only R from the R image data including NIR. As such, the image processing unit 42 acquires image data (R, NIR) for all the pixels.

Further, the image processing unit 42 acquires the image data (G) for all pixels based on image data which is output by the sensor 35. The image processing unit 42 further acquires the image data (B) for all pixels based on the image data which is output by the sensor 36.

As such, the image processing unit 42 acquires image data (R, G, B, NIR) for all pixels.

The image capturing device 102 of the present exemplary embodiment is obtained by adding the coded IR cut filter 1 to a configuration of a general layered sensor type image capturing device, sensors 34 to 36. The coded IR cut filter 1 has a simple configuration obtained by a simple modification of a general cut filter. In other words, an advantageous effect that only adding a simple configuration to a configuration similar to a related art, image processing of a visible light region and a near infrared region becomes possible, whereby reduction of production cost and reduction of malfunctions can be expected can be provided.

Further, according to the fifth exemplary embodiment, even under the circumstance where near-infrared light is strongly saturated, the saturation can be suppressed by diffracting and separating the near-infrared light, widening an apparent dynamic range.

(Sixth Exemplary Embodiment)

Figure 18:
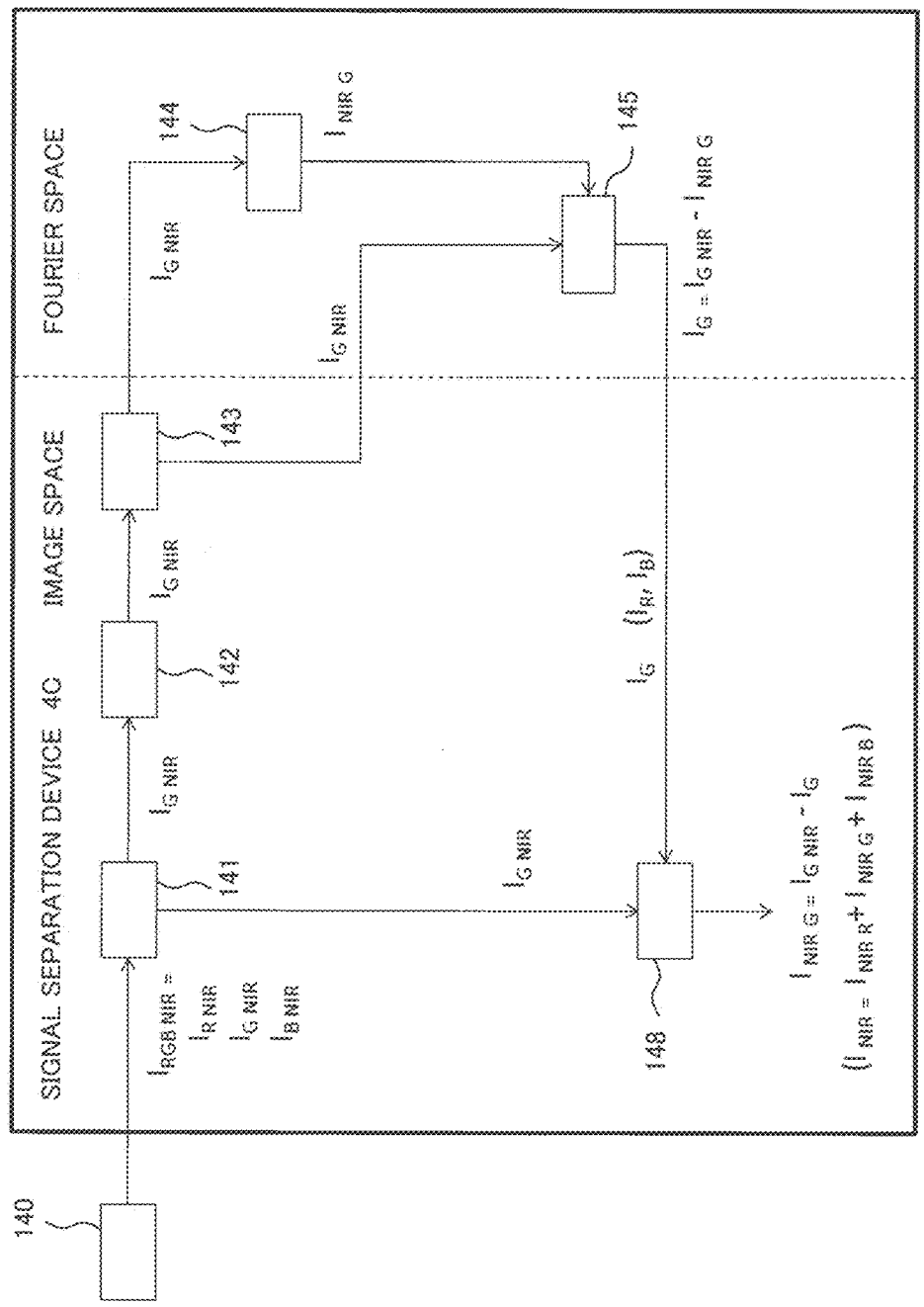
FIG. 18 is a functional block view of a signal separation device according to a sixth exemplary embodiment.

FIG. 18 is a functional block view of a signal separation device 4C according to an exemplary embodiment of the present invention. The signal separation device 4C has an image data acquisition unit 141, a first color signal acquisition unit 142, a Fourier transform unit 143, a periodic pattern detection unit 144, a peak removing unit 145, and a near-infrared signal acquisition unit 148.

The image data acquisition unit 141 acquires image data from external means 140. The image data includes a plurality of color signals. In addition, the image data includes a periodic pattern of near-infrared light.

The first color signal acquisition unit 142 acquires a color signal (a first color signal) from the image data. The first color signal includes an apparent color signal (a second color signal) with a near-infrared signal.

The Fourier transform unit 143 transforms the first color signal into a two-dimensional Fourier space. In this case, the first color signal includes a periodic pattern of near-infrared light. As the result, the near-infrared light shows peaks at specific frequencies in the two-dimensional Fourier space.

The periodic pattern detection unit 144 detects peaks formed by the near-infrared light component at specific frequencies.

The peak removing unit 145 removes the peak at the specific frequency from the first color signal in the two-dimensional Fourier space. The information after removal of the peak is the second color signal in the two-dimensional Fourier space.

The near-infrared signal acquisition unit 148 performs an inverse Fourier transform on information, from which the peak has been removed, to acquire the second color signal. In other words, the second color signal is a color signal of only a visible light component that does not include near-infrared light. Then, the near-infrared signal acquisition unit 148 acquires a near-infrared signal by subtracting the second color signal from the first color signal. The signal separation device 4C acquires a near-infrared signal for each of a plurality of color signals, thereby extracting NIR data.

As described above, according to the sixth exemplary embodiment, an advantageous effect of acquiring only a near-infrared light signal from the image data that includes a plurality of color signals can be provided.

(Seventh Exemplary Embodiment)

Figure 19:
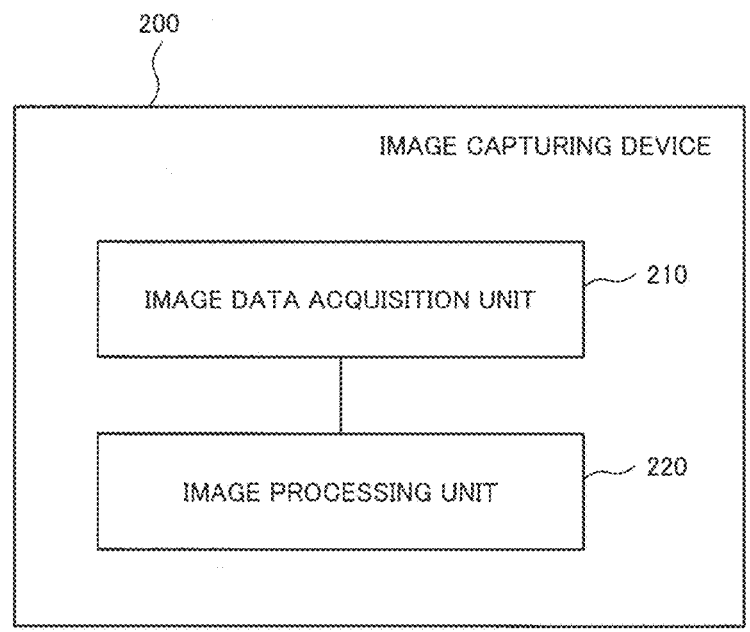
FIG. 19 is a schematic configuration view of an image capturing device according to a seventh exemplary embodiment.

The seventh exemplary embodiment, which embraces the above-described exemplary embodiments, will be described with reference to FIG. 19. An image capturing device 200 according to the seventh exemplary embodiment includes an image data acquisition unit 210 and an image processing unit 220.

The image data acquisition unit 210 acquires image data that includes a periodic pattern of near-infrared light. The image processing unit 220 acquires color signals of visible light components and near-infrared signals from the image data based on the periodic pattern.

The image data acquisition unit 210 is equivalent to the image data acquisition unit 140 according to the first exemplary embodiment. The image processing unit 220 is equivalent to the image processing device 4.

Having the above-described configuration, according to the seventh exemplary embodiment, an advantageous effect that an image processing of a visible light region and a near infrared region can be performed easily while utilizing a configuration of a general image capturing device.

(Others)

The present invention has been hereinabove explained using preferred embodiments, but the present invention is not necessarily limited to the above embodiments, and can be modified and carried out in various manners within the scope of the technical concept.

In the above exemplary embodiments, R, G, B are described as color channels, different color channels, such as C (cyan), M (magenta), Y (yellow), may also be implemented in the same way.

(Supplement)

Figure 5:
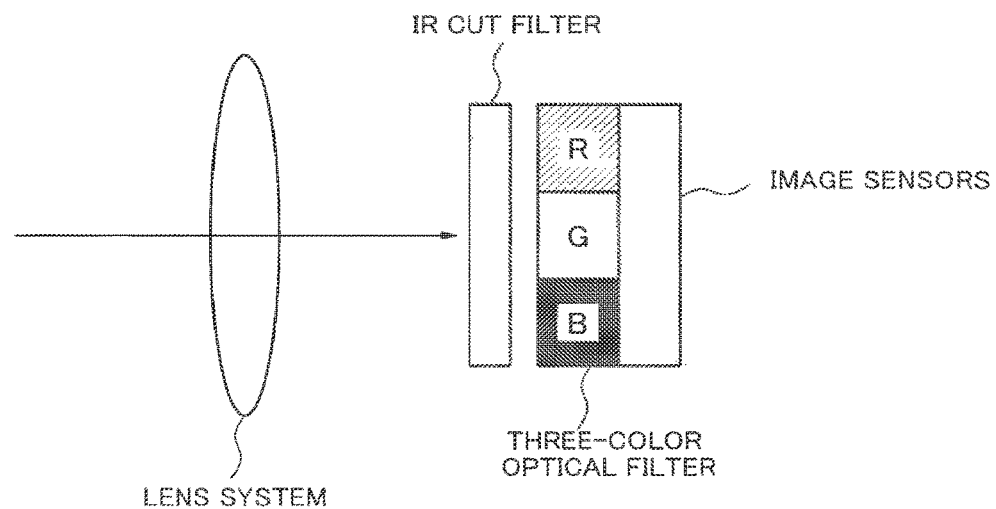
FIG. 5 is a schematic configuration of the optical system of a color image input device.
Figure 6:
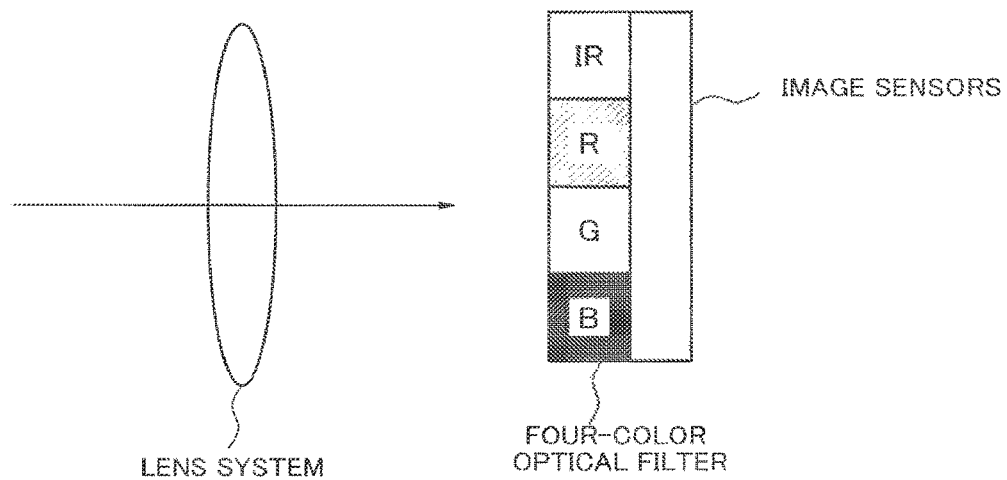
FIG. 6 is a schematic configuration of an imaging device that uses a four-color optical filter.

A general image capturing device has a basic configuration comprising a near infrared cut filter, an optical filter, and a photo sensor (see FIG. 5). A near infrared light is removed by a near infrared cut filter. On the other hand, although a photo sensor inherently has the sensitivity as far as a near infrared region, the capability of the photo sensor has not been taken advantage of.

The present inventor focuses on the sensitivity in a near infrared region of a photo sensor which has not been effectively utilized. Further, the present inventor has examined image processing of a visible light region and a near infrared region while utilizing a configuration of a general image capturing device.

The inventor has examined the above matters and completed the present invention.

Figure 20:
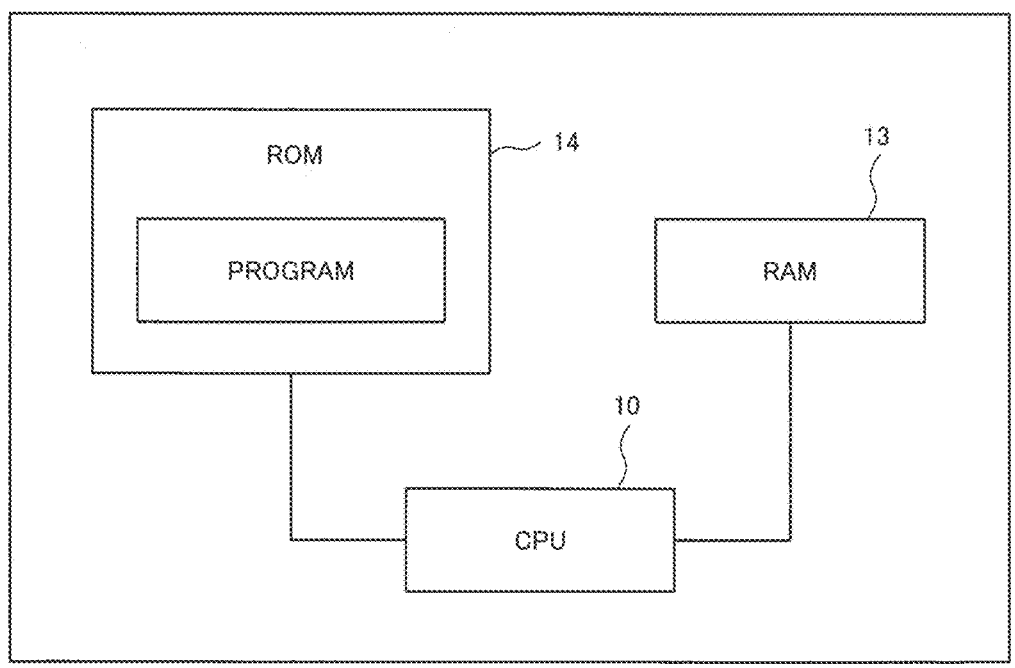
FIG. 20 is a diagram exemplifying a hardware configuration that realizes an image capturing device according to the exemplary embodiments.

It should be noted that the image processing unit and code information memory of the image capturing device as illustrated in the drawings are implemented by the hardware resources as illustrated in FIG. 20. That is, the configuration illustrated in FIG. 20 includes a CPU (Central Processing Unit) 10, a RAM (Random Access Memory) 13, and a ROM (Read Only Memory) 14.

In the above exemplary embodiment, each unit may be configured as hardware or implemented by a computer. When the units are implementing by a computer, the same functions and operation as above are implemented by a processor that operates in accordance with a program stored in a program memory. Further, only part of the functions may be implemented by a computer program.

Further, a part or whole of the above-described exemplary embodiments may be described as the following Supplementary Notes without limitation thereto.

(Supplementary Notes)

An image capturing device including:
image data acquisition means 140 which acquires image data which includes a periodic pattern of near-infrared light; and
image processing unit 4, 4A, 4B, 41, 42 which acquires color signals of visible light components and near-infrared signals from the image data based on the periodic pattern.

The image capturing device, in which
the image processing unit 4, 4A, 4B, 41, 42 preferably
acquires first color signals of a plurality of colors from the image data;
transforms the first color signals into a two-dimensional Fourier space;
acquires second color signals which are color signals of the visible light components by removing peaks which form the periodic pattern of the near-infrared light in the two-dimensional Fourier space; and
acquires near-infrared signals by subtracting the second color signals from the first color signals.

The image capturing device, in which
the image processing unit 4, 4A, 4B, 41, 42 preferably has:
an image data acquisition unit 141 which inputs image data which includes a periodic pattern of near-infrared light;
a first color signal acquisition unit 142 which acquires first color signals of a plurality of colors from the image data;
a Fourier transform unit 143 which transforms the first color signals into a two-dimensional Fourier space;
a periodic pattern detection unit 144 which detects peaks which form the periodic pattern of the near-infrared light in the two-dimensional Fourier space;
a peak removing unit 145 which removes peaks in the two-dimensional Fourier space;
a second color signal acquisition unit 146 which acquires second color signals which are color signals of the visible light components by performing an inverse Fourier transform on the information, from which the peak was removed; and a near-infrared signal acquisition unit 147 which acquires near-infrared signals by subtracting the second color signals from the first color signals.

The image capturing device, in which preferably has:

a code information memory which stores frequency information at the peak of the near-infrared light which is periodically generated in the two-dimensional Fourier space; and the image processing unit 4B removes the peak of the periodic pattern based on the frequency information which is stored in the code information memory.

The image capturing device in which, the image data acquisition means 140 preferably includes:

a coded infrared cut filter 1 which has infrared cut units 11 which cut near-infrared light and infrared transmissive units 12 which pass near-infrared light; and the infrared transmissive units 12 are provided at position with regular periodicity in the coded infrared cut filter 1.

The image capturing device, in which the image data acquisition means 140 preferably includes:

an optical filter 2 which separates an incident light into a plurality of colors;

a photo sensor 3 which converts the plurality of colors which the optical filter 2 has separated into image data representing image signals;

a coded infrared cut filter 1 which is provided in front of the optical filter 2 in the light traveling direction or between the optical filter 2 and the photo sensor 3, and which includes an infrared cut units 11 which cut a near infrared light and an infrared transmissive units 12 which pass the near infrared light; and wherein the infrared transmissive units 12 are provided at positions with regular periodicity in the coded infrared cut filter 1.

The image capturing device, in which the image data acquisition means 140 preferably includes:

a color separation unit 21 which separates the incident light into a plurality of lights whose bands of wavelength are different;

photo sensors 31 to 33 which are provided for the plurality of lights separated by the color separation unit 21 and converts the plurality of lights to data as image signals; and a coded infrared cut filter 1 which has infrared cut units 11 which cut off a near infrared light and infrared transmissive units 12 which pass the near-infrared light and is provided for at least one of the separated plurality of lights, wherein the infrared transmissive units 12 are provided at positions with regular periodicity in the coded infrared cut filter 1.

The image capturing device, in which the image data acquisition means 140 preferably includes:

a layered sensor 34 to 36, in which a plurality of sensors are layered, and that respectively converts a plurality of lights with different wavelength bands to data as iamge signals; and a coded infrared cut filter 1 which has infrared cut units 11 which cut a near-infrared light and infrared transmissive units 12 which pass the near-infrared light, wherein the infrared transmissive units 12 are provided at positions with regular periodicity in the coded infrared cut filter 1.

A signal separation device including:

image data acquisition means 140 which acquires image data which includes a periodic pattern of a near-infrared light; and image processing unit 4C which acquires near-infrared signals from the image data based on the periodic pattern.

An image capturing method including:

acquiring image data which includes a periodic pattern of a near-infrared light; and acquiring color signals of visible light components and near-infrared signals from the image data based on the periodic pattern.

An image capturing method including: preferably, acquiring first color signals of a plurality of colors from the image data;

transforming the first color signals into a two-dimensional Fourier space;

acquiring second color signals which are color signals of the visible light components by removing peaks which form a periodic pattern of a near-infrared light in the two-dimensional Fourier space; and acquiring near-infrared signals by subtracting the second color signals from the first color signals.

The image capturing method including: preferably, acquiring frequency information from a code information memory which stores the frequency information at peaks of the near-infrared light which is periodically generated in the two-dimensional Fourier space; and removing the peak in the periodic pattern based on the frequency information.

The image capturing method including: preferably, having infrared cut units 11 which cut off a near-infrared light and infrared transmissive units 12 which pass the near-infrared light; and acquiring image data which includes a periodic pattern of near-infrared light via the coded infrared cut filter 1 in which the infrared transmissive units 12 are provided at positions with regular periodicity.

The claimed invention has been described so far with reference to the above-described exemplary embodiments, without limitation thereto. A variety of modifications that will be understood by those skilled in the art can be made to the configuration and details of the claimed invention within the scope thereof.

This application is based upon and claims the benefit of priority from Japanese patent application No. 2014-044447, filed on Mar. 6, 2014, the disclosure of which is incorporated herein in its entirety.

INDUSTRIAL APPLICABILITY

The present invention can be applied to image capturing devices, such as digital cameras and video cameras.

REFERENCE SIGNS LIST

1. coded IR cut filter
2 optical filter
3 photo sensor
4 image processing device
4A, 4B image processing unit
4C signal separation device
5 code information memory
11 infrared cut unit
12 infrared transmissive unit
21 prism
31 to 36 sensor
41, 42 image processing unit
100, 100B image processing device
101 image capturing device(three-plate type)
102 image capturing device(layered sensor type)

What is claimed is:

1. An image capturing device comprising:
a coded infrared cut filter in which an infrared cut unit and an infrared transmissive unit are arranged, the infrared cut unit cutting a near infrared light, the infrared transmissive unit passing the near infrared light;
an optical filter which separates an incident light into a plurality of colors;
a photo sensor which converts the light which has passed through the optical filter into image data composed of a plurality of color signals; and
an image processing unit configured to acquire the plurality of color signals and near-infrared signals from the image data composed of the plurality of color signals by using a periodic pattern of the near-infrared light formed in the image data, the periodic pattern of the near-infrared light being formed depending on a pattern of the infrared transmissive unit of the coded infrared cut filter.

2. The image capturing device according to claim 1, wherein
the coded infrared cut filter is provided in front of the optical filter in the light traveling direction.

3. The image capturing device according to claim 1, wherein
the infrared transmissive unit is provided at a position with regular periodicity in the coded infrared cut filter.

4. The image capturing device according to claim 1, wherein
the image processing unit
transforms the image data composed of the plurality of color signals into a two-dimensional Fourier space,
acquires color signals which include only a visible light component by removing peaks which form the periodic pattern of the near-infrared light in the two-dimensional Fourier space, and
acquires near-infrared signals by subtracting the color signals which include only the visible light component signals from the plurality of color signals.

5. The image capturing device according to claim 4, further comprising:
a code information memory which stores frequency information at the peak of the near-infrared light which is periodically generated in the two-dimensional Fourier space.

6. An image capturing method comprising:
arranging a coded infrared cut filter, an optical filter, and a photo sensor in light path, the coded infrared cut filter in which an infrared cut unit and an infrared transmissive unit are arranged, the infrared cut unit cutting a near infrared light, the infrared transmissive unit passing the near infrared light, the
optical filter separating an incident light into a plurality of colors, the
photo sensor converting the light which has passed through the optical filter into image data composed of a plurality of color signals; and
acquiring the plurality of color signals and near-infrared signals from the image data composed of the plurality of color signals by using a periodic pattern of a near-infrared light formed in the image data, the periodic pattern of the near-infrared light being formed depending on a pattern of the infrared transmissive unit of the coded infrared cut filter.

* * * * *